Oct. 23, 1928.
N. H. SAUNDERS
1,688,989
EXTENSION RIM ATTACHMENT
Filed May 31. 1927     2 Sheets-Sheet 1
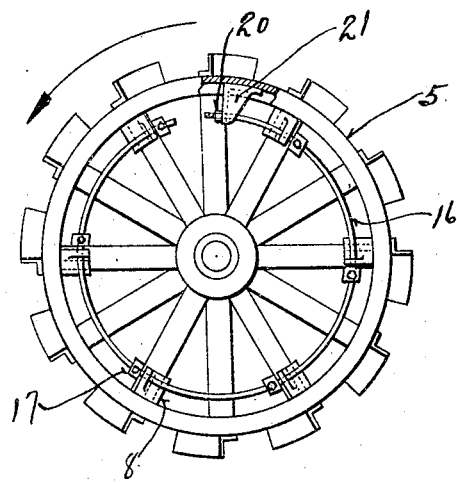
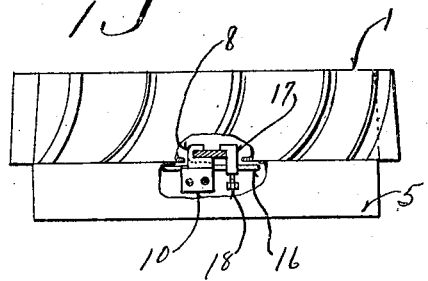
Inventor
Nathan H. Saunders
By
Attorneys

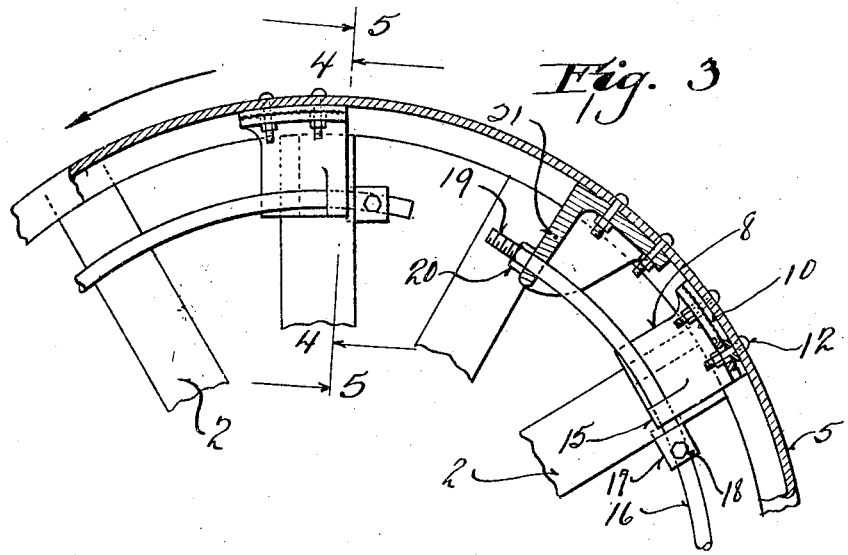
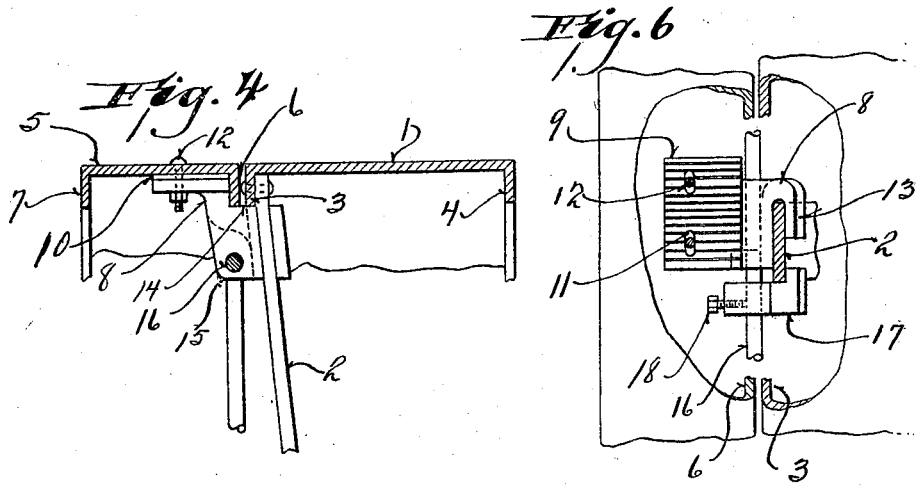
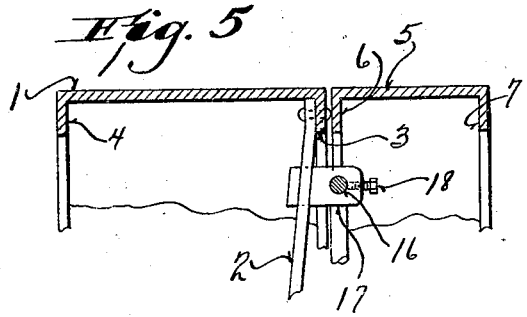

Patented Oct. 23, 1928.

1,688,989

UNITED STATES PATENT OFFICE.

NATHAN HOWARD SAUNDERS, OF CAMBRIDGE, WISCONSIN.

EXTENSION-RIM ATTACHMENT.

Application filed May 31, 1927. Serial No. 195,426.

This invention relates to an extension rim attachment, and is particularly adapted for the use in work with tractors.

Extension rims have been provided for tractors but these have not proven wholly satisfactory as they require the tightening and positioning of a large number of bolts or set screws or other members of this type and, consequently, require a material length of time for their attachment or for their detachment from the tractor wheel. The net result of this is that the operator to avoid the delay of using the extension wheel very frequently uses the tractor in places where the extension wheel should be used, and does not stop to put on the extension rim.

This invention is designed to provide a novel form of extension rim which may be attached by merely tightening one nut and may be loosened in a similar manner, thus requiring the minimum effort on the part of the operator and also occupying the minimum amount of time for this operation.

Further objects are to provide a very simple and sturdy type of tractor extension rim which may be made by simple processes and may be cheaply sold and easily operated by anyone.

An embodiment of the invention is shown in the accompanying drawings in which:

Figure 1 is a side view of a tractor wheel with the attachment in place, such view being partly in section;

Figure 2 is a view looking down on the structure shown in Figure 1 with parts broken away;

Figure 3 is an enlarged sectional view through a portion of the rim;

Figure 4 is a transverse sectional view approximately on the line 4—4 of Figure 3 looking in the direction of the arrows;

Figure 5 is a similar view on the line 5—5 of Figure 3 looking in the direction of the arrows;

Figure 6 is an enlarged view looking directly down at the face of the rim and the adjacent portion of the tractor wheel with parts broken away and in section and with the auxiliary plate removed.

Referring to the drawings, it will be seen that a conventional type of tractor wheel 1 has been illustrated as provided with inwardly extending inner and outer flanges 3 and 4 to which flat spokes 2 are attached. The extension rim 5 is also provided with inner and outer flanges 6 and 7. This extension rim has brackets 8 bolted to its inner side at regular intervals corresponding to the position of the outer spokes of the tractor wheel. These brackets 8 are preferably provided with a corrugated or roughened bearing surface 9 which contacts with an auxiliary plate 10, such plate being similarly roughened to insure against relative slipping of the parts. It is to be noted that the outwardly projecting bearing portion 9 of the brackets 8 are each provided with elongated slots 11 and that the auxiliary plate 10 is provided with apertures adapted to align with these slots. Through these apertures and slots bolts 12 are passed which extend through the extension rim 5, as shown most clearly in Figure 3, and nuts are screwed upon the inner ends of these bolts to rigidly clamp the brackets in place against the bearing plates 10. The bearing plates 10 are thus permanently positioned with reference to the extension rim and the bearing portions 9 of the brackets 8 may be adjusted peripherally of the extension rim to accommodate variations in the positioning of the spokes 2, for it is well known that the spokes in commercial tractors vary slightly in their relative positions. After the correct position has been ascertained, the nuts are tightened upon the bolts 12 and the parts permanently clamped in position in the exact location required by the spokes.

Referring particularly to Figures 3 and 6, it will be seen that the brackets 8 are each provided with a laterally directed hooked portion 13 which is positioned around the spoke 2, as shown most clearly in Figure 6. These hooked portions are directed rearwardly with reference to the direction of rotation of the driving wheels in the normal forward travel of the tractor, as shown by the arrow in Figure 3. Thus, the driving effort of the tractor is transmitted from the spokes to each of the several brackets 8 and from thence to the extension rim 5. The brackets 8 are also each provided with a shoulder or face 14 (see Figure 4) which contacts with the inner edges of the outer rim 3 of the tractor wheel and the inner flange 6 of the extension rim.

It is to be noted also from reference to Figures 3 and 4 that the brackets 8 are provided with apertured lugs 15 through which a circular rod 16 slidably passes. The rod 16 has clamped thereto a plurality of auxiliary brackets 17 as shown for instance in Figure 6. These auxiliary brackets which may be termed "locking brackets" are held in place by means of set screws 18 and may thus be initially adjusted around the circular rod 16.

One end of the rod 16 is threaded, as indicated at 19, in Figure 3, and receives a nut 20 which bears against the face of a bracket 21 bolted to the inner side of the extension rim 5.

It is to be noted from a consideration of Figure 1, that one nut only is required for holding the rod 16 in position to cause all of the auxiliary brackets 17 to lock the spokes in place within the hook shaped part of the brackets 8. Loosening of the nut 20 would, consequently, permit sliding of the rod 16 with simultaneous movement of all of the auxiliary locking brackets 17. This causes the brackets 17 to move away from their respective spokes and to thus free themselves therefrom. Thereafter, the extension wheel or else the tractor wheel may be slightly turned one with reference to the other to free the spokes from the brackets 8 and the extension wheel may be removed directly from the tractor wheel.

The positioning of the extension wheel is equally simple. It is merely necessary to slide it laterally into position and thereafter cause relative rotation between the extension rim and the tractor wheel to position the spokes within the brackets 8. Thereafter, the single nut 20 is rotated to tighten the circular rod 16 and simultaneously draw all of the auxiliary brackets 17 into locking engagement with the spokes.

Thus, by the manipulation of a single nut, the extension wheel is locked upon the tractor and is freed therefrom by loosening of this nut.

It will be seen further that in case of backing, rotary motion is imparted to the extension wheel or rim through the auxiliary bracket 21 and through the circular rod 16, so that the extension rim operates as a unit with the tractor wheel.

It will be seen further that the guiding lugs 15 correctly position each of the several auxiliary brackets as such lugs guide the circular rod 16 immediately adjacent each of such auxiliary brackets.

It will be seen further that the device is extremely simple and may be cheaply and readily manufactured and most easily and quickly applied to and removed from the tractor wheel.

It is to be distinctly understood that other modes of attaching the rim to the tractor wheel may be employed without departing from the spirit of this invention provided that the attaching means engage the spokes of the tractor wheel and provided also that means are employed for locking the spoke engaging means against displacement.

Therefore, although the invention has been described in considerable detail, such description is intended as illustrative rather than limiting as the invention may be variously embodied and as the scope of such invention is to be determined as claimed.

I claim:

1. The combination of a tractor wheel having a plurality of spokes and an extension rim provided with a plurality of hooked members for engaging the spokes, and means for simultaneously locking said spokes in engagement with said members.

2. The combination of a tractor wheel having a plurality of spokes and an extension rim provided with a plurality of members for engaging said spokes, a plurality of locking members for locking said spokes in engagement with said members, and a single manipulating member for simultaneously operating all of said locking members.

3. The combination of a wheel provided with a plurality of spokes and an extension rim provided with a plurality of hooked brackets for engaging said spokes, said brackets having guiding lugs, and means guided by said lugs simultaneously locking the spokes in the hooked brackets.

4. An extension rim for tractor wheels provided with spokes, said rim comprising a body portion having a plurality of hooked brackets for receiving the spokes and having guiding means, a circular rod guided by said guiding means, a plurality of auxiliary brackets carried by said rod for locking the spokes in engagement with said first mentioned brackets, and means for moving said circular rod for simultaneously shifting said auxiliary brackets.

5. The combination of a tractor wheel provided with an inturned flange and spokes and an extension rim having a plurality of hooked brackets for receiving said spokes, said brackets each having a shoulder contacting with said flange and having guiding means, a circular rod guided by said guiding means and having a plurality of locking members carried by said rod for locking said spokes within said brackets, a bracket rigidly carried by said extension rim and through which said rod passes, and a nut bearing against said last mentioned bracket and threaded upon said rod.

6. The combination of a tractor wheel provided with a plurality of spokes and an extension rim provided with a plurality of members for engaging said spokes, and means for simultaneously locking all of said members to said spokes.

7. The combination of a tractor wheel provided with a plurality of spokes and an extension rim provided with a plurality of members for simultaneously engaging the corresponding spokes, and locking means for preventing disengagement of said members from said spokes.

In testimony that I claim the foregoing I have hereunto set my hand at Cambridge, in the county of Dane and State of Wisconsin.

NATHAN HOWARD SAUNDERS.